June 2, 1970 M. M. LORANG 3,515,803
CONTRAST RANGE CONTROL
Filed June 28, 1967 2 Sheets-Sheet 1

INVENTOR
MALCOLM M. LORANG
by Richard T. Seeger
Attorney

INVENTOR
MALCOLM M. LORANG
by [signature]
Attorney

United States Patent Office 3,515,803
Patented June 2, 1970

3,515,803
CONTRAST RANGE CONTROL

Malcolm M. Lorang, Garden Grove, Calif., assignor to The Magnavox Company, Fort Wayne, Ind., a corporation of Delaware Filed June 28, 1967, Ser. No. 649,506
Int. Cl. H04n 1/40
U.S. Cl. 178—6 9 Claims

ABSTRACT OF THE DISCLOSURE

Contrast range control for video signals, wherein a background and markings on the background are reproduced, is accomplished by passing the signal through a gain-controlled amplifier, sensing the background of the amplified signal, comparing the background signal with a voltage which corresponds to a desired limit of background darkness to obtain a correction signal for the gain of the gain-controlled amplifier. If the background is lighter than the limit set, then a rapid reduction in the gain of the amplifier takes place. If the background is darker than the limit, a gain in the amplifier takes place only after a given time delay.

BACKGROUND OF THE INVENTION

In facsimile systems where the contents of a document at one station are accurately reproduced in black and white at a second station, problems occur when the document has a gray background or a colored background, such as blue or pink. These backgrounds result in a gray reproduced background on the copy making it more difficult to define the reproduced contents of the copy.

Efforts to solve the problem have not been entirely satisfactory. Increasing the lightness of the copy will lighten the gray background, but it will also lighten the black lines so that the overall improvement is not significant. Also, it was difficult for the correction circuit to distinguish between a dark background and markings on the background. It remained for this invention to provide a solution.

SUMMARY OF INVENTION

This invention maintains a given contrast between the black markings and the background on the reproduced document for a given range of contrasts of a source document in a duplicating system such as a facsimile system by variably amplifying the transmitted signal carrying the source document information. A given contrast, therefore, is maintained between the black portions and the background, improving character definition.

This invention accomplishes this objective by amplifying all incoming signals with the assumption that the source document background is of a certain darkness level, and providing means to produce a desired contrast between the background and the black lines on the copy. With any source background lighter than this level, the amplification of the transmitted signal will be quickly and correspondingly reduced to maintain the desired contrast on the reproduced document. For any source background darker than this level, the amplification will be increased, but only after a certain time delay to insure that the black markings will not be cancelled. This is accomplished in a preferred embodiment by providing means to sense the background signal and comparing this with a reference background signal to obtain a difference signal which will then control the gain of the amplifier. Also, in a preferred embodiment, the signal is related to a reference voltage corresponding to the most black signal on the copy before it is compared to the background reference.

DESCRIPTION OF A PARTICULAR EMBODIMENT OF THE INVENTION

Figure 1:
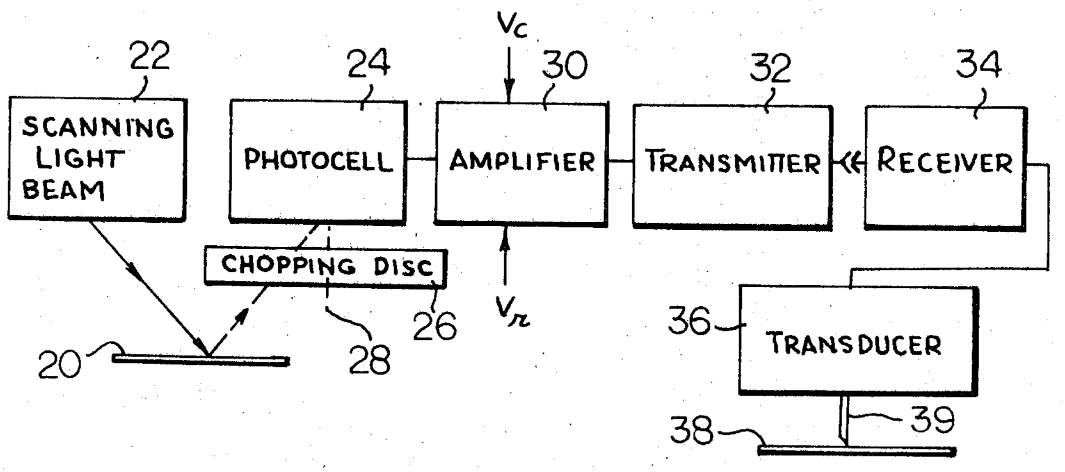
FIG. 1 is a schematic block diagram for a facsimile system.

In the disclosed embodiment source document 20, FIG. 1, at the transmitting station is scanned with a beam of light from a scanner 22 and the reflection from the document is reviewed by a photocell 24. In the embodiment shown, disc 26, which is rotatable about its axis 28, has notches cut in its periphery and as the disc rotates, it chops the light reflections from the document so that an A.C. signal is presented to photocell 24 rather than a D.C. signal to simplify signal processing, as disclosed in copending application Ser. No. 436,504, filed Mar. 2, 1965, by Reese et al. and entitled Optical System and now abandoned.

Amplifier 30 amplifies the signal from photocell 24 and sends the amplified signal to transmitter 32. The signal is then transmitted to receiver 34 by means of a telephone line, radio waves or other means and then sent to a transducer 36 which moves a probe 39 so that the contents of document 20 are reproduced as a copy 38. A system which may use the invention and which transmits through conventional telephone handsets and telephone lines is illustrated in more detail in copending application Ser. No. 549,759, filed Apr. 21, 1966, by Crane et al. and entitled Facsimile Systems now abandoned for continuing application Ser. No. 669,315. It is understood, of course, that this invention may be used in any system where there is a background which requires adjustment while maintaining full contrast.

Figure 2:
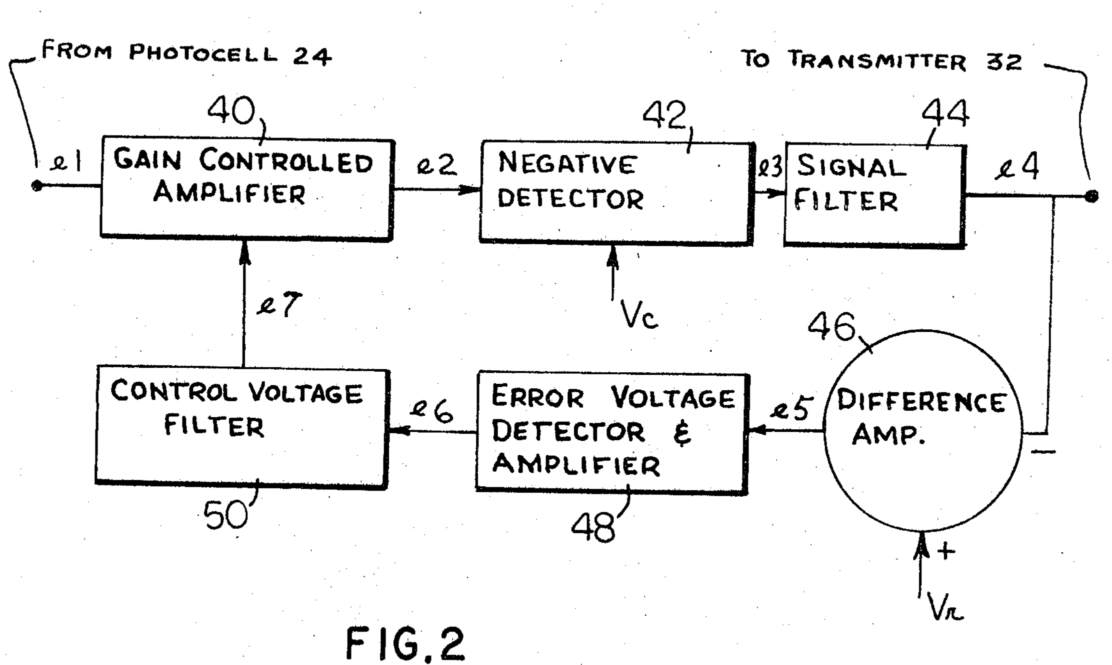
FIG. 2 is a schematic diagram of the amplifying block in FIG. 1.

FIG. 2 shows a more developed view of a portion of amplifier 30, in FIG. 1. The signal $e_1$ is the signal from the photocell. The background signal is derived by sensing the most negative portion of the signal $e_1$ as will be explained in more detail in reference to FIG. 3. In this embodiment, the black signals are more positive and the whiter signals less positive.

In FIG. 2, the signal $e_1$ from the photocell, or the baseband signal, drives gain-controlled amplifier 40 where the signal is amplified to form signal $e_2$. As indicated, the gain of amplifier 40 is controlled by voltage $e_7$, described later. The negative absolute value of $e_2$ is algebraically added in negative detector 42 to a reference voltage $V_c$ corresponding to the most black, or lower contrast limit to form signal $e_3$. This references signal $e_3$ to the most black reference voltage. Signal $e_3$ is smoothed by signal filter 44 to obtain signal $e_4$. The background portion of the signal $e_4$ is sensed and differenced with voltage $V_r$ in difference amplifier 46 to form error signal $e_5$. $V_r$ is a voltage which may be the darkest level background for which rapid correction is desired. In other words, $V_r$ will be uncorrected if the background on the document 20 corresponds to the level for which $V_r$ is set. For backgrounds on document 20 lighter than the "darkest level" background, the amplification will be quickly reduced to maintain a given contrast on copy 38 while backgrounds on document 20 darker than the given background will increase amplification but only after a given time delay.

A positive signal, $e_5$, is generated by amplifier 46 and this is sent to error voltage detector and amplifier 48 and then to filter 50, from which signal $e_7$ passes to gain-controlled amplifier 40, completing the loop. It is seen that the lighter the background, the higher $e_1$, but the lower $e_3$ and $e_4$ and the higher $e_5$, $e_6$ and $e_7$ which reduces the gain of amplifier 40, decreasing background level.

Figure 3:
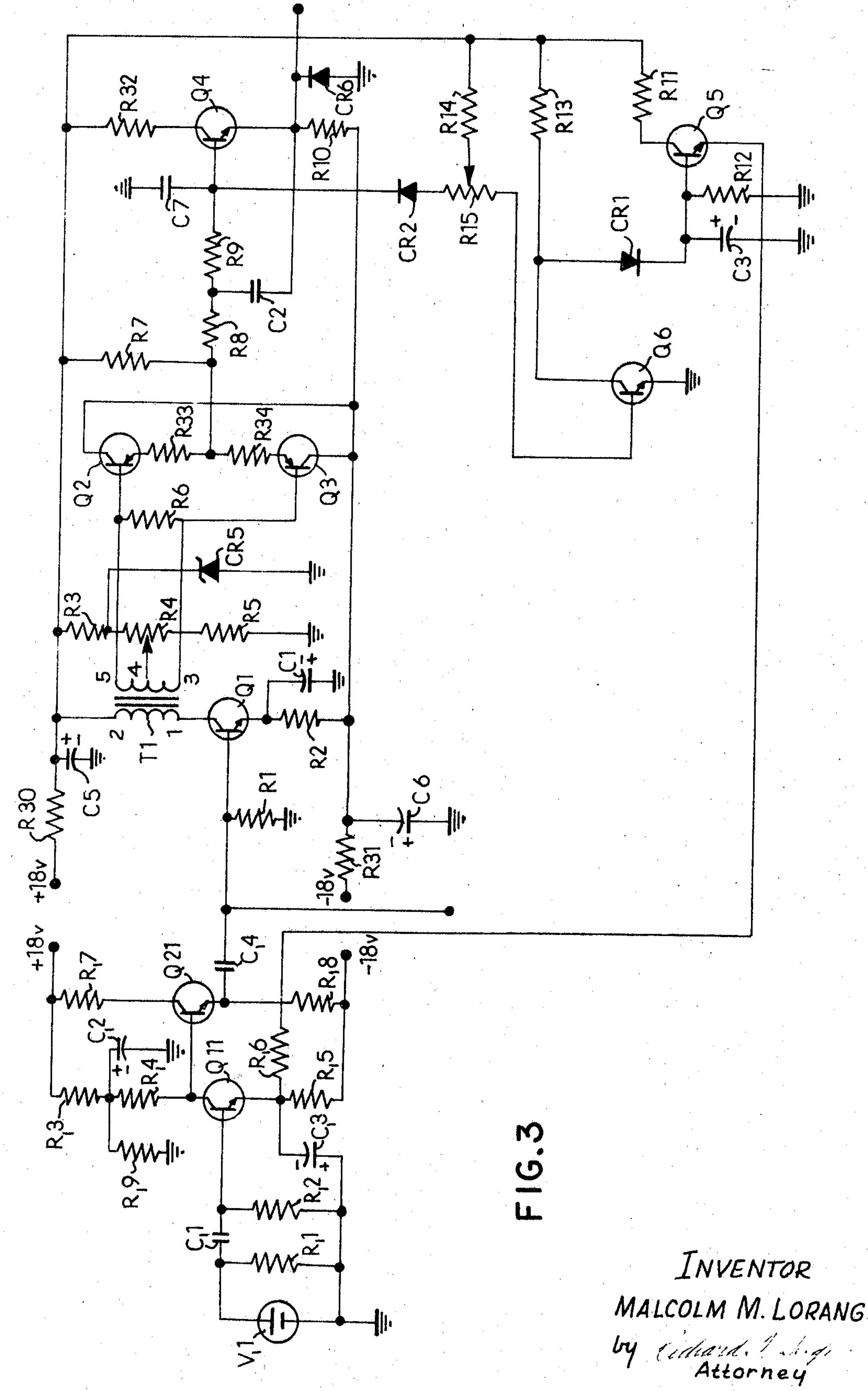
FIG. 3 is a schematic component diagram, with component values shown, of the embodiment of FIG. 2.

A still more detailed description is seen in FIG. 3, wherein is shown a schematic circuit diagram of a preferred embodiment of this invention.

Amplifier transistor $Q_{11}$ performs the operation of amplifier 40 of controlling the signal. $Q_{11}$ is gain controlled by controlling the D.C. current to the emitter. $Q_{11}$ is a common emitter and amplifier for the signal flow, and a common base stage for D.C. and control signal flow. The gain of $Q_{11}$ is approximately equal to the ratio of its load resistance to emitter degenerative resistance, "*re*." "R*e*" is inversely proportioned to the D.C. emitter current and therefore the gain of $Q_{11}$ is directly proportioned to its D.C. emitter current. The initial D.C. emitter current of $Q_{11}$ is set by $R_1$5. When an error voltage appears at the emitter of $Q_5$, lower right corner of FIG. 3, it will by virtue of change in potential on $R_1$6 remove some of the emitter current from $Q_{11}$ reducing the gain of $Q_{11}$.

Transistors $Q_1$, $Q_2$ and $Q_3$ perform the function of negative detector 42 operation on the signal which is to take the difference between the most black reference and the absolute value of the baseband signal. Transistor $Q_1$ and transformer $T_1$ buffer and transfer the signal to a balanced output, pins 5 and 3 of $T_1$, which is clamped to a D.C. voltage, via pin 4 near the Zener voltage of CR5, which is the black reference signal, $V_c$. This balanced A.C. signal swing around the Zener voltage is applied to transistors $Q_2$ and $Q_3$. For the negative going half cycle of the signal transistors $Q_2$ and $Q_3$ will conduct, giving an output that is the difference between the most black level, near Zener voltage, and the absolute value of the signal. In other words, a negative full-wave detector is referenced or clamped to the most black level, CR5 Zener voltage, by a circuitry of transistors $Q_1$, $Q_2$, and $Q_3$.

Transistor $Q_4$ and its associated components filter and buffer the output of transistors $Q_2$ and $Q_3$ and form an active RC filter to synthesize a complex pole pair or a RCL low pass filter and buffer. This performs the function of filter 44 in FIG. 3. Diode CR2 senses at its cathode the most negative signal from the photocell to provide the background signal.

Transistor $Q_6$, diode CR2 and resistor R15 perform the function of difference amplifier 46 in FIG. 2 of comparing a background signal to a reference voltage $V_r$, which is obtained from potentiometer R15. When the background signal voltage is "lighter" than the reference voltage $V_r$, an error signal is generated to reduce the amplification at transistor $Q_{11}$. When the background signal voltage is "darker" than voltage $V_r$, $Q_6$ remains saturated. This saturated condition is caused by the fact that the majority of the current from R14 must enter the base of $Q_6$ because the voltage at the cathode of CR2 is too positive to conduct. When the signal at the cathode of diode CR2 becomes sufficiently negative to conduct and remove current from the base $Q_6$, $Q_6$ will become unsaturated. This occurs for the most negative portions of the signal or the background voltage. When $Q_6$ becomes unsaturated, CR1 will conduct causing a charge on capacitor C3. The charge on capacitor C3, or the error voltage, will be buffered by transistor $Q_5$ and will remove current from transistor $Q_{11}$, the gain-controlled amplifier transistor, by providing a current diverting voltage across R6. Transistor $Q_5$, diode CR1, resistances R13 and R12 perform the function of filter 50 in FIG. 2 of filtering and buffering the error voltage. R13 and C3 control the attack time and C3, R12 control the decay time of the Automatic Background Control section. The attack time is short to provide instant correction for lighter background and the decay time is long so that for darker backgrounds the correction through $Q_5$ will not take place until it is established that the dark signal is in fact a background signal.

The following values for the components in FIG. 3 were used in a particular embodiment of this invention:

| | |
|---|---|
| $C_1$**1**—.0033 μF. | $R_1$**7**—470 |
| $C_1$**2**—15 μF. | $R_1$**8**—18K |
| $C_1$**3**—15 μF. | $R_1$**9**—9.1K |
| $C_1$**4**—.01 μF. | **R6**—220K |
| $R_1$**1**—6.8K | **R7**—18K |
| $R_1$**2**—10K | **R8**—9310 |
| **C1**—15 μF. | **R9**—4990 |
| **C2**—.022 μF. | **R10**—18K |
| **C3**—300 μF. | **R11**—1K |
| **C5**—75 μF. | **R12**—100K |
| **C6**—75 μF. | **R13**—16K |
| **C7**—.01 μF. | **R14**—220K |
| **R1**—9.1K | **R15**—10K |
| **R2**—8.2K | **R32**—4.3K |
| **R3**—1.3K | **R33**—1K |
| **R4**—500 | **R34**—1K |
| **R5**—2K | **CR1**—1N3064 |
| $R_1$**3**—2K | **CR2**—1N3064 |
| $R_1$**4**—62K | **CR5**—1N712A |
| $R_1$**5**—91K | **CR6**—1N34 |
| $R_1$**6**—7.5K | |

While particular modifications have been described, it will be understood that various other modifications may be made within the spirit and scope of the invention. For example, the background could be other than white. A black background, with white markings, could be maintained black without sacrifice of contrast.

What is claimed is:

1. Apparatus comprising
video reproducing means for receiving information and reproducing markings on a record material, in accordance with such information,
contrast control means for maintaining the background shading on the record material at a first given level and the contrast between the background shading and the marking against that background at a second given level on the record material for a predetermined range of received background shadings,
means to rapidly correct for a background lighter than said first given level and to more slowly correct for a background darker than said first given level so that reception of information corresponding to the marking signals will not result in a background correction.

2. Apparatus comprising
video receiving means for receiving reflected illumination from a source material,
video reproducing means in electrical communication with said video receiving means for reproducing on a record material markings in accordance with the information received from the video receiving means,
contrast control means for maintaining the background shading on the record material at a first given level and the contrast between the background shading and the marking against that background at a second given level on the record material for a predetermined range of received background shadings on the source material,
means to rapidly correct for a background lighter than said first given level and to more slowly correct for a background darker than said first given level so that reception of information corresponding to the marking signals will not result in a background correction.

3. Apparatus comprising
a video pick up means for receiving reflected illumination from a source material having a background and markings on the background,
video reproducing means in electrical communication with said video pick up means for reproducing the information received from said pick up means on a record material, gain-controlled amplifier means in said reproducing means for receiving and amplifying the information received from said video pick up means, the gain of said amplifier means being set to amplify so that a background which is of a predetermined non-white level will appear white on the reproducing material, background sensing means, means to decrease the gain of said amplifier means whenever the background sensing means senses a background more white than said predetermined non-white level, said means decreasing the gain of said amplifier means in proportion to the amount that the background being sensed is more white than the said predetermined non-white level.

4. Apparatus adapted to receive signals from a video pick up means which receives reflected illumination from a source material having a background and markings on the background, that improvement comprising, video reproducing means in electrical communication with said video pick up means for reproducing the information received from said pick up means on a record material, gain-controlled amplifier means in said reproducing means for receiving and amplifying the information received from said video pick up means, the gain of said amplifier means being set to amplify so that a background which is of a predetermined non-white level will appear white on the reproducing material, background sensing means, means to decrease the gain of said amplifier means whenever the background sensing means senses a background more white than said predetermined non-white level, said means decreasing the gain of said amplifier means in proportion to the amount that the background being sensed is more white than the said predetermined non-white level.

5. The apparatus of claim 4 with said background sensing means providing a background signal corresponding to background being sensed, means to reference the signal representing the source material information with a reference voltage corresponding to the darkest marking on the background material to obtain a referenced, first difference signal, means to compare the first difference signal with a second reference voltage corresponding to the predetermined background, for which the amplifying means will correct, to obtain a second difference signal, means to decrease the gain of said amplifying means in correspondence to said second difference signal.

6. The apparatus of claim 4 with said background sensing means comprising a diode, said diode being biased to conduction only when the background level of the souce material is lighter than the predetermined non-white level.

7. The apparatus of claim 6 with a first transistor for controlling the gain of the signal representing the source material information, a second transistor responsive to conduction of said diode to cause a voltage at the emitter of first transistor so that current is caused to flow from the emitter of said first transistor decreasing the gain of said first transistor.

8. The apparatus of claim 6 with a first resistance capacitance combination for receiving the sensed background signal to rapidly charge the capacitor when said diode is biased to conduction to effect a rapid change in amplification, a second resistance capacitance combination to slowly discharge the capacitor when said diode is not biased to conduction, the charge time of said first resistance capacitor controlling the time for correction of the background when it is lighter than said preset background and the discharge time of said second resistance capacitance controlling the time for correction of the background when the background is darker than said present background.

9. The apparatus of claim 8 with a first transistor for controlling the gain of the signal representing the source material information, a second transistor responsive to conduction of said diode to cause a voltage at said first transistor for decreasing the gain of said first transistor, the base of said second transistor being connected to a plate of the capacitor in said first and second resistance capacitance combinations.

References Cited

UNITED STATES PATENTS

| | | | |
|---|---|---|---|
| 3,274,335 | 9/1966 | Gray | 178—7.1 |
| 3,322,893 | 5/1967 | Townsend | 178—7.1 |
| 2,509,987 | 5/1950 | Newman. | |
| 2,877,297 | 3/1959 | Marzan | 178—6.6 |
| 2,911,464 | 11/1959 | Wheele | 178—6.6 |
| 3,153,726 | 10/1964 | Murphy | 178—6.6 |
| 3,271,513 | 9/1966 | Marzan | 178—6.6 |

ROBERT L. GRIFFIN, Primary Examiner

H. W. BRITTON, Assistant Examiner

U.S. Cl. X.R.

178—6.6, 7.1, 7.3

Disclaimer 3,515,803.—*Malcolm M. Lorang*, Garden Grove, Calif. CONTRAST RANGE CONTROL. Patent dated June 2, 1970. Disclaimer filed Dec. 13, 1971, by the assignee, *The Magnavox Company*.

Hereby enters this disclaimer to all claims of said patent.

[*Official Gazette July 18, 1972.*]